United States Patent
Horst et al.

(10) Patent No.: US 6,427,632 B1
(45) Date of Patent: Aug. 6, 2002

(54) REMOTE CONTROLLED GATE ASSEMBLY

(75) Inventors: Glenn Z. Horst, Denver; James L. Sensenig, Lebanon, both of PA (US)

(73) Assignee: Triple H. Construction Co., Inc., Ephrata, PA (US)

( * ) Notice: Subject to any disclaimer, the term of this patent is extended or adjusted under 35 U.S.C. 154(b) by 0 days.

(21) Appl. No.: 09/884,654

(22) Filed: Jun. 20, 2001

(51) Int. Cl.$^7$ .............................. A01K 1/02
(52) U.S. Cl. .................. 119/518; 119/721; 119/840
(58) Field of Search .................. 119/518, 14.03, 119/720, 721, 840, 752; 49/42, 49, 58, 59, 60, 208

(56) References Cited

U.S. PATENT DOCUMENTS

| | | | | |
|---|---|---|---|---|
| 3,908,599 A | * | 9/1975 | Flocchini .................. 119/510 |
| 4,000,718 A | | 1/1977 | Brown .................... 119/14.03 |
| 4,026,069 A | * | 5/1977 | Bohnett ..................... 119/840 |
| 4,194,467 A | | 3/1980 | Nielson et al. ........... 119/14.03 |
| 4,261,297 A | * | 4/1981 | Van Maarion et al. ...... 119/840 |
| 5,156,108 A | | 10/1992 | Hawbaker ................ 119/14.03 |
| 5,183,008 A | | 2/1993 | Carrano .................... 119/155 |
| 5,441,016 A | * | 8/1995 | Ricketts ..................... 119/723 |
| 5,622,141 A | * | 4/1997 | Lareva ...................... 119/843 |
| 5,653,192 A | * | 8/1997 | Sheen et al. ............. 119/51.02 |
| 5,782,199 A | | 7/1998 | Oosterling ............... 119/14.02 |
| 5,803,015 A | * | 9/1998 | Rhodes et al. ........... 119/14.02 |
| 5,979,365 A | * | 11/1999 | Sorraghan et al. ......... 119/502 |
| 6,095,086 A | | 8/2000 | Aurik et al. ............. 119/14.02 |

\* cited by examiner

*Primary Examiner*—Yvonne R. Abbott
(74) *Attorney, Agent, or Firm*—Martin Fruitman

(57) ABSTRACT

The apparatus is a remote controlled gate assembly. The rotation is accomplished by rotating a plate with an attached yoke to capture the lower rail of the gate. The yoke arrangement permits the gate to be manually operated by lifting it out of the yoke. The plate is itself rotated by a drive shaft passing through a hole in a device attached to the end of the gate. Multiple gates can be driven by a single cable, which moves around pulleys atop the drive shafts. The gate or the drive cable is driven by a remote controlled reversible motor, permitting the operator to open or close the gates without actual contact.

8 Claims, 4 Drawing Sheets

REMOTE CONTROLLED GATE ASSEMBLY

BACKGROUND OF THE INVENTION

This invention deals generally with animal husbandry and more specifically with a remote controlled crossover gate within a dairy barn.

Most people not directly involved with agriculture do not realize the complexity involved in some aspects of agriculture. For example, in the dairy industry, barns are laid out to facilitate both the free movement of the cows and the rapid distribution of feed to them. A typical dairy barn is now laid out with an access aisle between two rows of stalls, with the feed station for each stall located adjacent to the aisle. This permits the caretaker of the cows to move along the aisle and place feed into each stall. This action usually is performed from a tractor-pulled wagon which is loaded with feed and is driven along the aisle. It is also frequently necessary to move a tractor along the aisle for other reasons, such as pushing feed back into the feeding area.

Another feature of such barns is the inclusion of crossover gates along the aisle. Such gates are swung across the aisle to permit the cows to roam freely across the aisle and throughout the barn without actually having access to the aisle. However, such access gates block the progress of the feed wagon along the aisle and must be opened and closed by the tractor operator. Essentially, this means the operator must leave the tractor as he approaches every gate, open the gate, move the tractor and wagon beyond the gate area, and then walk back to close the gate if that is necessary. This action must be performed at every gate area in the bam, and it is clearly a time consuming operation.

It would be very helpful and efficient to provide a means for opening and closing crossover gates in a barn without requiring the caretaker to dismount from the tractor each time a gate must be opened or closed.

SUMMARY OF THE INVENTION

The present invention is a crossover gate which is remote controlled to permit anyone carrying a portable remote control to open or close the aisle crossover gates from a remote location, whether on or off a tractor. Although for the typical use of the invention, the gates are arranged to form two adjacent crossover paths, the basic unit of the invention is a configuration which forms a single crossover path. This basic unit is constructed with support poles at the four corners of the crossover path, with a pair of posts on each side of the access aisle, and with each pair of posts aligned with the permanent barrier along the aisle which prevents animals from entering the aisle from that side. The pair of posts on each side of the aisle is separated by a distance which determines the width of the crossover path.

Sections of the gates which rotate to either close off the access aisle or define the crossover path are hung from each of the comer support posts. Each gate is formed of two sections, and each section rotates approximately 90 degrees and forms half of either a gate across the access aisle or a gate parallel to the aisle. The gate sections each have end sections which include horizontally extending loops so that the loops on the two gate sections which face each other to form a whole gate actually overlap and the location of the junction of the two sections is not critical. In order for the gate sections to overlap without interfering, the gate section hung from any particular corner post is configured with its horizontal end loops vertically offset from the horizontal end loops on the two gate sections with which its loops interact.

This results in the gate sections which are on opposite corners of the four post configuration having similarly placed extending loops, so that the gate sections hung on two opposite corners of the post configuration have a set of loops which are higher than the loops on the gate sections hung from the other opposite corners.

The non-interfering extending loop configuration also eliminates the requirement that the distance across the access aisle be the same as the width of the aisle. Since the gate sections overlap without interference, the amount of overlap can vary significantly between the position when a gate is across the aisle and when it is parallel to the aisle, so, for instance, the overlap when the gates are parallel to the aisle can be much less than the overlap when the gates are across the aisle.

A single motor is used to swing all four gates of the invention, and this motor and its control are the types which are typically installed in overhead garage door openers. Such motors are typically controlled by a battery operated remote control, so they fulfill all the requirements of the invention. Furthermore, such motors can be modified to drive a pulley which moves a cable. The invention uses just such a pulley and cable drive to rotate the gate sections. The motor driven cable is routed around a pulley atop each corner support post, so that when the motor is activated by the remote control, all four gate sections simultaneously change their positions. Moreover, since garage door opener motors are inherently reversible, the pulleys and gate sections can be rotated in both directions.

An additional feature of the invention is the provision for manual rotation of the gate sections if, for some reason such as loss of power, the motor is inoperative. This is accomplished by using the motor to rotate drive shafts on each corner post, which are actually independent of the gates. These drive shafts pass freely through the hollow vertical end tubing of the gate sections or through collars attached to the gate sections and are attached to bottom plates located below the corner of the gate sections, but not to the gate sections themselves. Each of these bottom plates has a yoke type structure attached at a location offset from the drive shaft, and with the bottom edge of the gate section resting in the yoke, any rotation of the drive shaft also rotates the gate section. Thus, when the motor rotates the drive shafts, all the gate sections also rotate. However, if the power fails, the operator needs only to lift each gate section out of its yoke on the bottom plate and rotate the gate section around the axis of the drive shaft into the desired position. This can be done completely independent of the drive shaft, the pulleys, and the motor.

The present invention thereby furnishes a dual operating system which can be operated either by remote controlled power or manually if that is required.

DETAILED DESCRIPTION OF THE INVENTION

Figure 1:
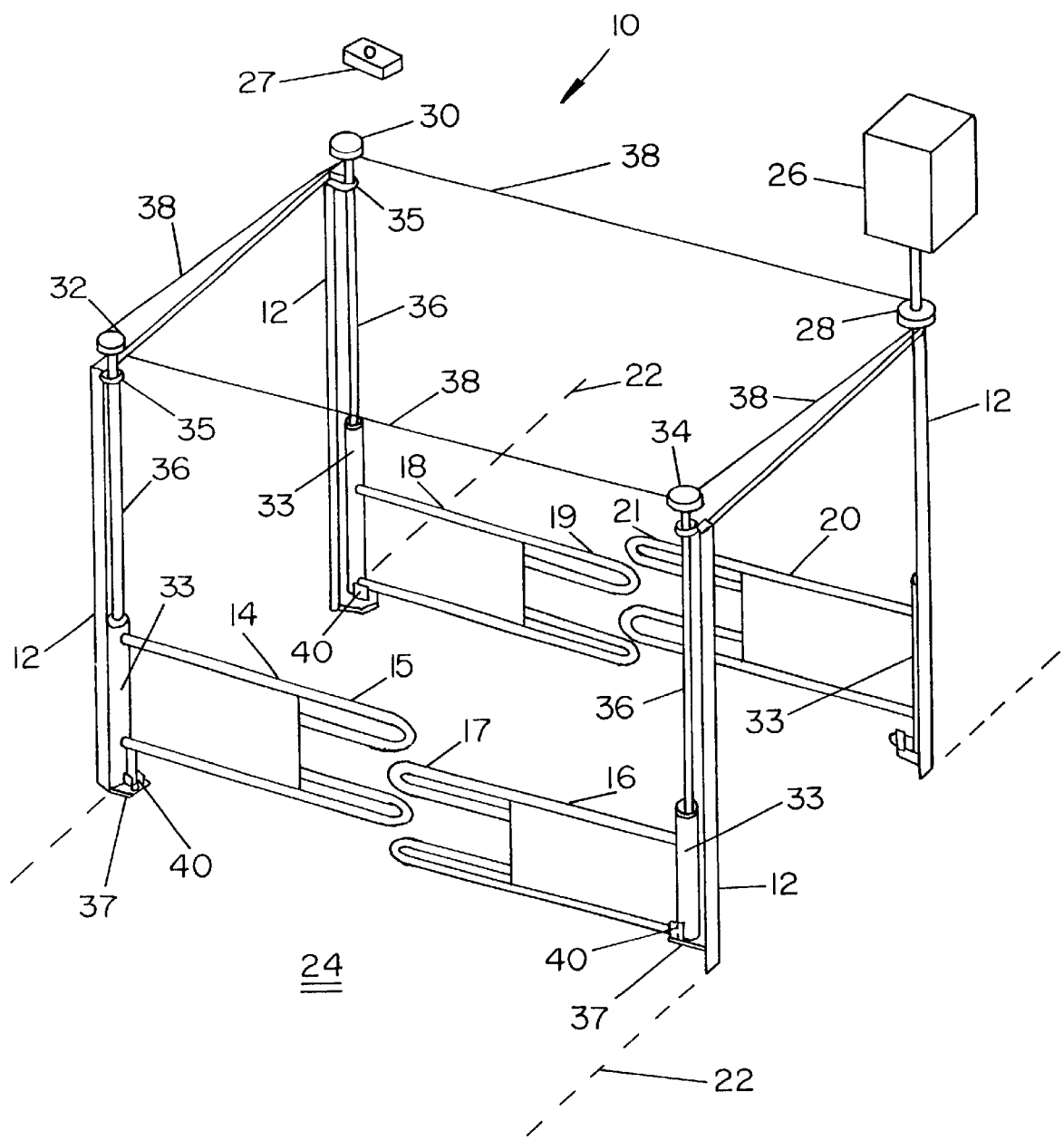
FIG. 1 is a simplified perspective view of one embodiment of the invention.

FIG. 1 is a simplified perspective view of gate assembly 10 of one embodiment of the invention in which corner posts 12 support gate sections 14, 16, 18, and 20. Corner posts 12 are located within lines of permanent barriers which are not shown, but the location of which are indicated by dashed lines 22. These barriers within the barn are used to restrict access of the animals to aisle 24 while permitting the animals to cross over aisle 24 at locations determined by gate assembly 10.

As can be seen in FIG. 1, gate sections 14 and 20, which are located at opposite corners of gate assembly 10, are hung higher than gate sections 16 and 18 at the other opposite corners. This permits the gate sections, which for ease of manufacture are essentially identical, to overlap without interfering with each other. This is true both when the gate sections are in the positions shown across aisle 24 and also when the gate sections are each rotated 90 degrees so that they are parallel to aisle 24 and aligned with lines 22 of the permanent barrier. To prevent interference and permit different overlap in the two gate section positions, the gate sections are constructed with finger-like end loops which interleave with each other when the gate sections face each other to form the fully closed gate. Thus, end loops 15 and 17 of gate sections 14 and 16 interleave when in the position shown in FIG. 1, but if all the gate sections are rotated to align with permanent barrier lines 22, gate section 16 and gate section 20 face each other, and end section 17 interleaves with end section 21. The end loops interleave with each other with an amount of overlap which is completely independent of the overlap in their other positions.

FIG. 1 also shows one of the available structures for gate sections 14, 16, 18, and 20 by which drive shaft 36 is coupled to the gate sections by an arrangement which makes it possible to easily disconnect the gate sections and rotate them independently of drive shaft 36. To accomplish this, drive shaft 36 is actually connected only to rotating plate 40 at the bottom of each gate section. As opposed to being directly attached to hollow vertical tube 33 at the end of each gate section, drive shaft 36 passes through vertical tube 33, is attached to rotating plate 40, and is supported by bottom bearing 37 which is attached to corner post 12. A yoke is attached to rotating plate 40 and thus rotates with drive shaft 36. Since a portion of each gate section is captured in the yoke, the gate sections then rotate with their associated drive shaft 36, but can also be lifted out of the yoke to be rotated manually. This structure is shown more clearly in regard to FIG. 3 and FIG. 4 which differ from FIG. 1 mainly in the structure of the gate sections at their ends nearest to corner posts 12.

The rotation of gate sections 14, 16, 18, and 20 is driven by reversible motor 26 which powers pulley 28. Motor 26 is the type of motor used for automatic garage door openers and is controlled by portable remote control 27. Pulley 28 is one of four pulleys located at the top of corner posts 12. Each of the pulleys 28, 30, 32, and 34 is mounted atop and rotates a drive shaft 36. Each drive shaft 36 is held on a corner post 12 by top bearing 35 and bottom bearing 37 and is coupled to a gate section by an arrangement described below in regard to FIG. 3 and FIG. 4. Pulleys 28, 30, 32, and 34 are interconnected by cable 38 which is driven by pulley 28 that is attached to motor 26.

Figure 2:
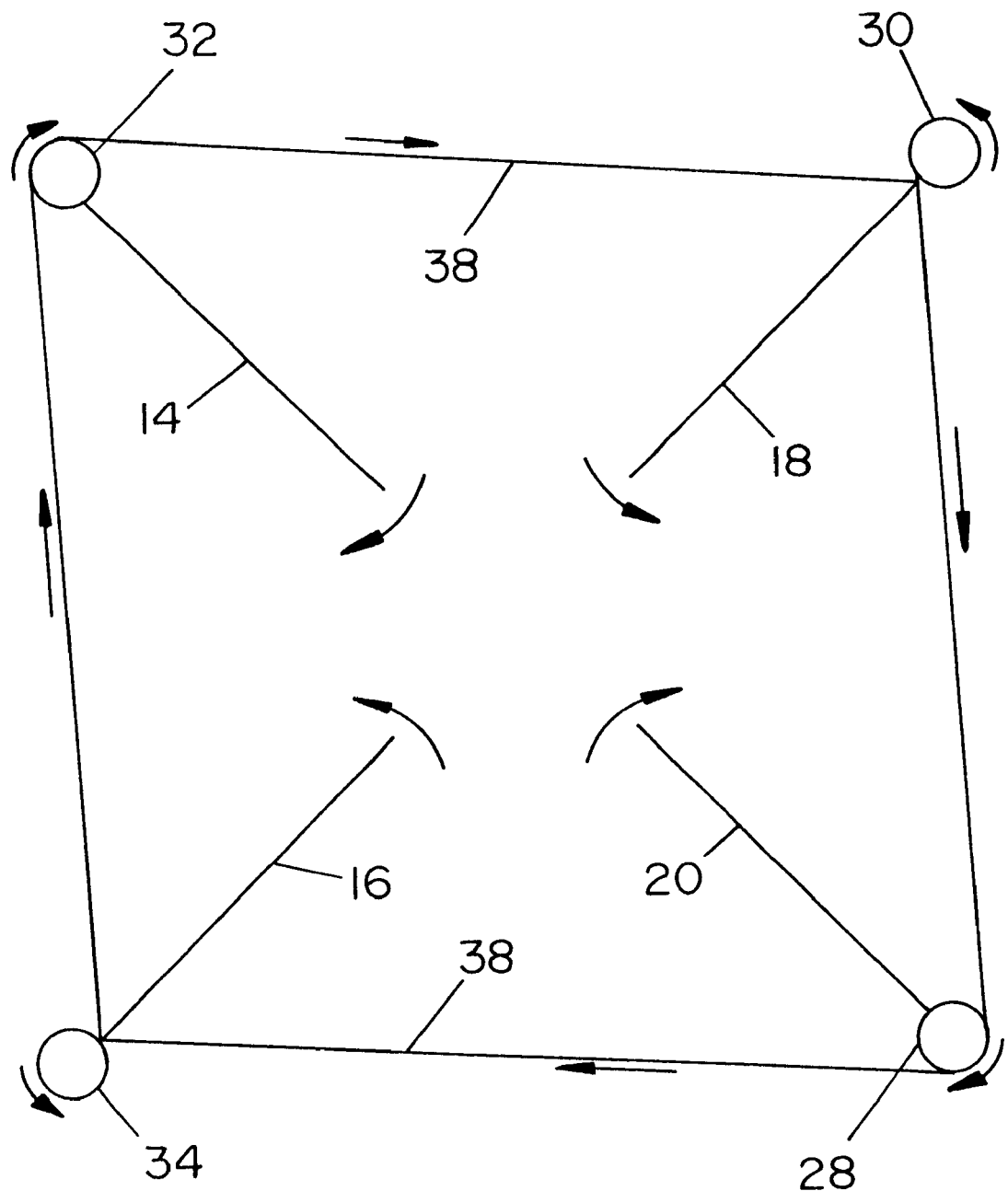
FIG. 2 is a schematic layout of the invention showing the pulleys and the cable which rotate the gate sections.

FIG. 2 depicts the schematic top view layout of cable 38 around the pulleys. This arrangement is not what would be intuitively expected because during any rotation action two pulleys must rotate clockwise and two pulleys must rotate counter clockwise. As shown in FIG. 2, in which gate sections 14, 16, 18, and 20 are represented by appropriately labeled lines, cable 38 is wrapped around the outside of pulleys 28 and 32 so that when pulley 28 is driven in a clockwise direction by the motor (not shown) to which it is connected, pulley 32 also rotates clockwise. These motions are indicated in FIG. 2 by directional arrows, as are the directions of motion of all the other components shown. Since pulleys 30 and 34 must always rotate in the direction opposite from the rotation of pulleys 28 and 32, cable 38 is wrapped around pulleys 30 and 34 so that cable 38 starts and ends on the inside of the pulleys. This makes pulleys 30 and 34 move opposite from pulleys 28 and 32 where cable 38 is wrapped around only the outside. As can be seen from FIG. 2, this cable arrangement causes the gate sections in opposite corners of the configuration to always rotate opposite from the gate sections in the other opposite corners.

The arrows shown in FIG. 2 indicate the motion for one direction of cable 38 which would cause the gate sections to move across aisle 24 to the position shown in FIG. 1, but when the motor is reversed, all the directional arrows reverse and the gate sections would then move into positions parallel to aisle 24.

Figure 3:
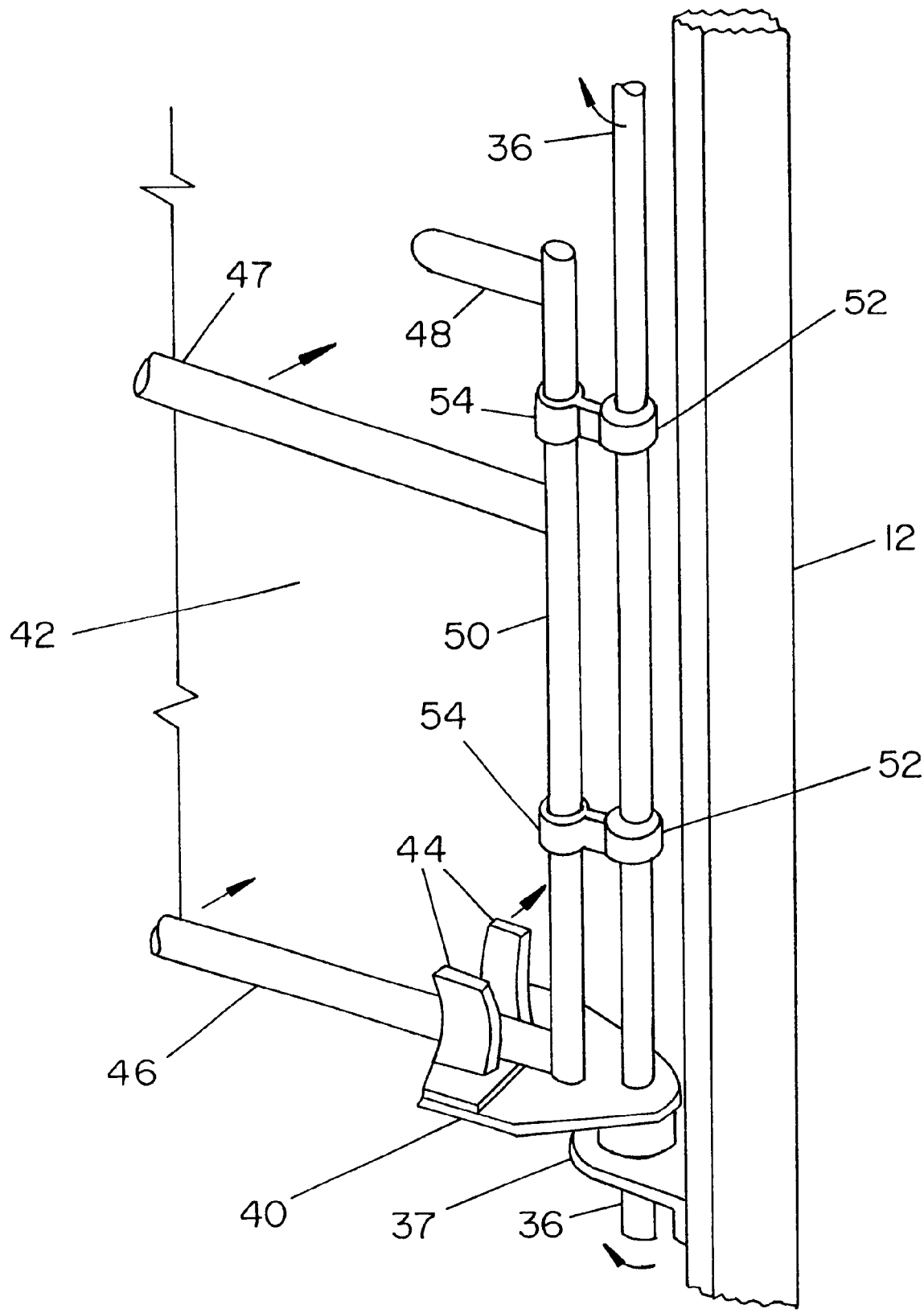
FIG. 3 is a perspective view of part of another embodiment of the invention and shows the apparatus which rotates a gate section while also permitting the gate section to be rotated manually.
Figure 4:
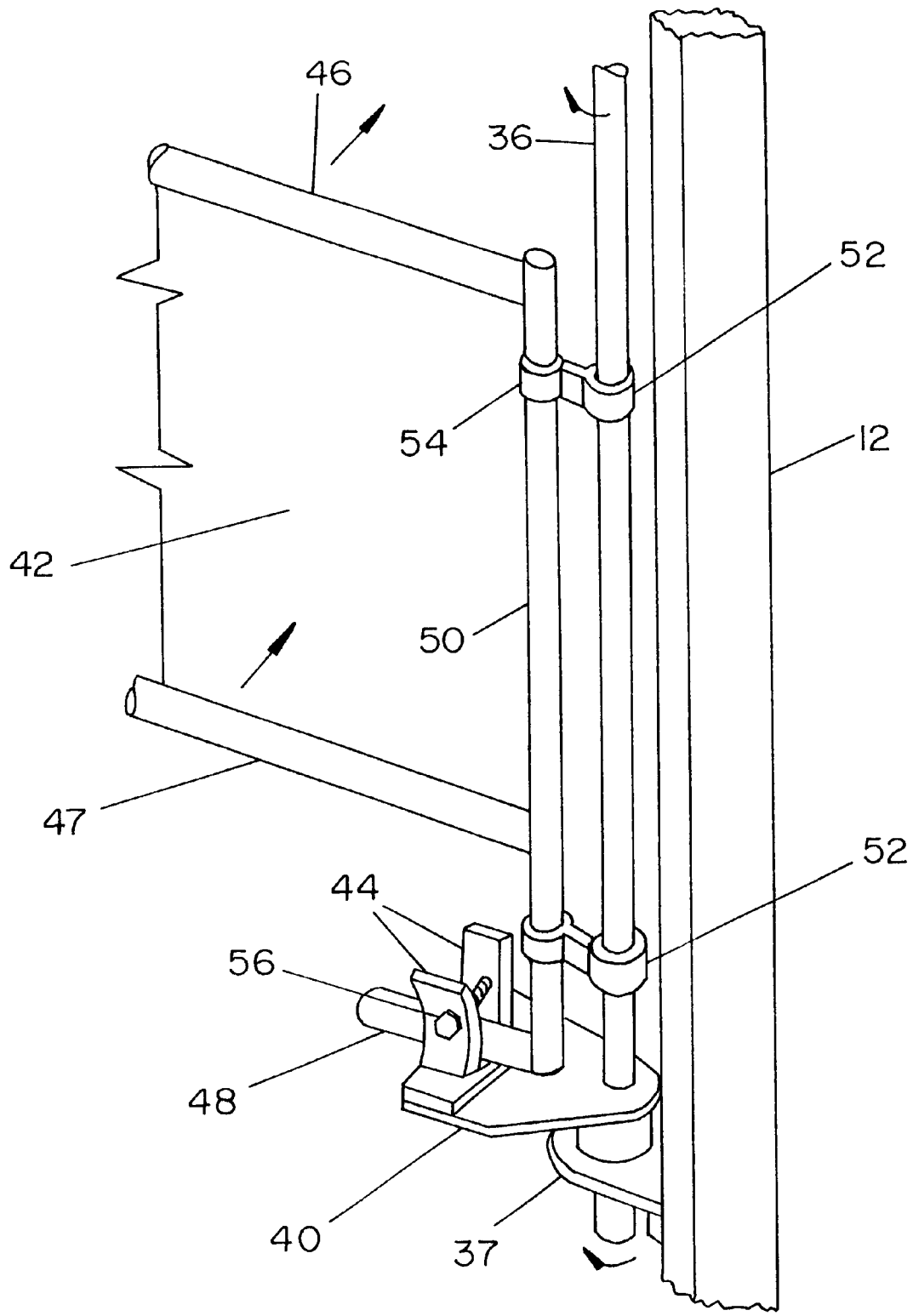
FIG. 4 is a perspective view of the gate section of FIG. 3 installed upside down to locate the gate section at a higher vertical position than the gate section of FIG. 3.

FIG. 3 is a perspective view of part of another embodiment of the invention more clearly showing the apparatus for rotating the gate sections with the drive motor while also permitting each gate section to be manually rotated if necessary. FIG. 3 and FIG. 4 also show a gate section with an end structure different from that of FIG. 1. The gate section end structure shown in FIG. 3 and FIG. 4 permits the use of identical gate sections throughout the gate assembly of the invention. This is accomplished essentially by using the gate section as the higher gate section in a first position and upside down for the lower gate section. Even in FIG. 1, a gate section constructed the same as gate section 14, needs only to be installed upside down to serve for gate section 16.

In FIG. 3, as previously explained, drive shaft 36, like all the other drive shafts of the invention except the one directly coupled to motor 26, is driven by a pulley (not shown) at its top end. Drive shaft 36 is also coupled to gate section 42 by an arrangement which makes it possible to easily disconnect gate section 42 and rotate it independently of drive shaft 36. To accomplish this, drive shaft 36 is actually connected only to rotating plate 40 at the bottom of gate section 42. Rather than being directly attached to vertical end tube 50 of gate section 42, drive shaft 36 passes through collars 52, is attached to rotating plate 40, and is supported by bottom bearing 37 which is attached to corner post 12. Collars 52 are clamped to vertical end tube 50 of gate section 42 by clamps 54. Yoke 44 is attached to rotating plate 40 and thus rotates with drive shaft 36. The directions of rotation of the various components are shown by directional arrows, and, of course, when the rotation of drive shaft 36 is reversed, all the other directions of movement are also reversed.

Gate section 16 is only coupled to drive shaft 36 because bottom rail 46 of gate section 42 rests within yoke 44 and is rotated along with yoke 44 as drive shaft 36 acts as a pivot axis for gate section 42 because drive shaft 36 passes through collars 52 that are attached to gate section 42. However, collars 52 not only pivot upon drive shaft 36, but also can slide freely upward on drive shaft 36. Thus, to rotate gate section 42 manually, it is only necessary to lift bottom rail 46 out of yoke 44 as collars 52 slide up drive shaft 36 and then freely rotate gate section 42 in whatever direction is desired. To set up gate section 42 for powered rotation all that need be done is to replace bottom rail 46 into yoke 44.

FIG. 4 is a perspective view of gate section 42 when it is installed higher than the installation shown in FIG. 3 so that the cooperating gate sections interleave as shown in FIG. 1. As can be appreciated from a comparison between FIG. 4 and FIG. 3, the change for FIG. 4 is that gate section 42 is upside down compared to FIG. 3. This permits lift rail 48 to be below rail 47 of the gate section. Lift rail 48 not only raises gate section 42 to permit its end loops (see FIG. 1) to interleave with the other gate sections, but it also fits into rotating yoke 44 to rotate gate section 42 along with rotating plate 40. With the gate section configuration shown in FIG. 3 and FIG. 4, all the gate sections can be constructed identically.

An optional device is also shown in FIG. 4. Gate section 42 can easily be locked into place in yoke 44 by merely installing locking bolt 56 across yoke 44.

It should also be appreciated that the distance between rails 46 and 47 can be filled with either a solid sheet, as shown in FIG. 1, or additional horizontal lengths of tubing (not shown) attached to vertical end tube 50.

The preferred embodiment of the invention thereby furnishes a simple gate assembly for animal barns which is normally powered by an electric motor and controlled by a small portable remote control, but also can easily be manually operated when conditions require.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, a single gate section, such as gate section 20, could be used alone to open or block access to a portion of a building and controlled by remote controlled motor 26.

What is claimed as new and for which Letters Patent of the United States are desired to be secured is:

1. A gate assembly comprising:
   at least one vertical post;
   a vertical rotatable drive shaft supported on the post;
   a reversible motor coupled to the drive shaft and capable of rotating the drive shaft in either direction;
   a rotatable structure attached to the drive shaft and rotatable with the drive shaft;
   a capture device attached to the rotatable structure;
   a gate including at least one device with a through hole located at one edge of the gate with the drive shaft passing through the device's through hole so that the gate is supported in a vertical plane and can pivot around the drive shaft; and
   a holding structure attached to the gate, with the holding structure held by the capture device in a manner which permits the holding structure to be removed from the capture device.

2. The gate assembly of claim 1 wherein the reversible motor is controlled by a portable remote control.

3. The gate assembly of claim 1 wherein the capture device is a yoke structure.

4. The gate assembly of claim 1 wherein the capture device has an open top and the holding structure of the gate structure is removed from the capture device by lifting the gate up while sliding the device with a through hole up along the drive shaft.

5. The gate assembly of claim 1 wherein the holding structure is a bottom rail of the gate.

6. The gate assembly of claim 1 wherein the gate structure is formed with spaced apart extensions extending from the side opposite from the edge which can pivot around the drive shaft.

7. The gate assembly of claim 1 wherein the gate assembly includes four posts, each with a gate assembly pivoting around a drive shaft and at least three drive shafts have attached pulleys which are driven by a cable that is driven by the reversible motor.

8. The gate assembly of claim 7 wherein spaced apart extensions extend from the side of each gate opposite from the edge which can pivot around the drive shaft and the extensions on each gate are located at a vertical height different from the extensions of the gates with which each gate will overlap.

* * * * *